Jan. 6, 1942.  B. G. M. MUSELIER  2,268,957
SYSTEM FOR SUPPLYING AND METERING LIQUID FUEL TO MOTORS
Filed Aug. 28, 1939   2 Sheets-Sheet 1
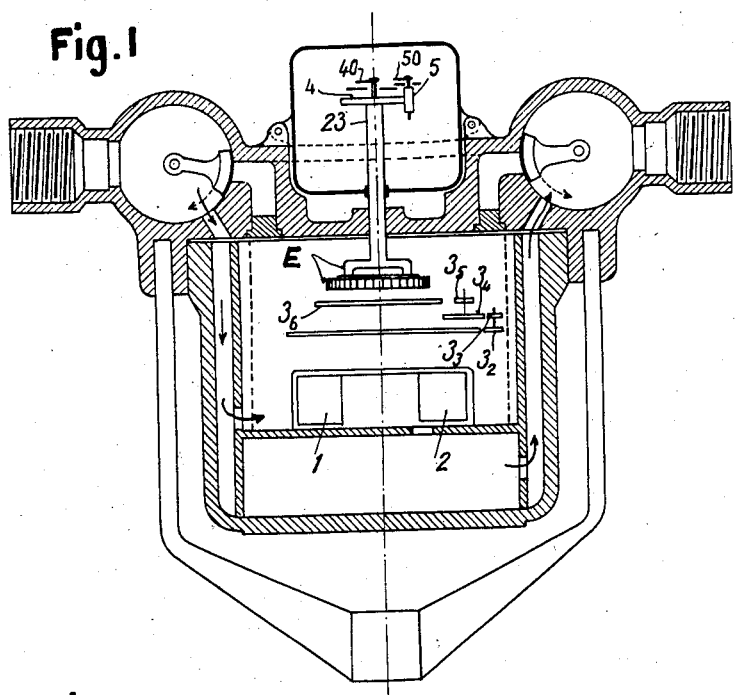
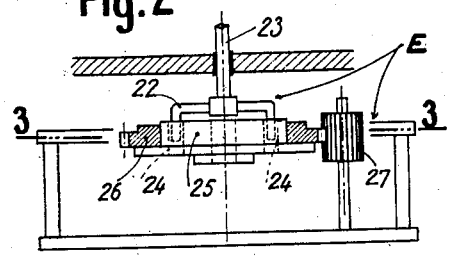
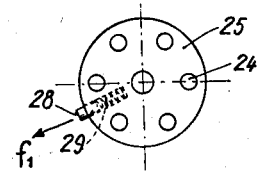
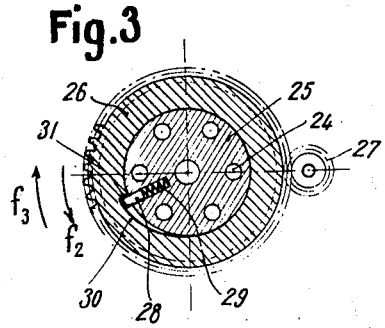
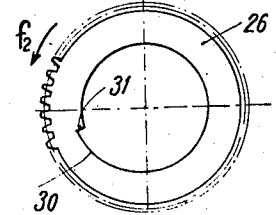
INVENTOR
B.G.M. MUSELIER Jan. 6, 1942.   B. G. M. MUSELIER   2,268,957
SYSTEM FOR SUPPLYING AND METERING LIQUID FUEL TO MOTORS
Filed Aug. 28, 1939   2 Sheets-Sheet 2
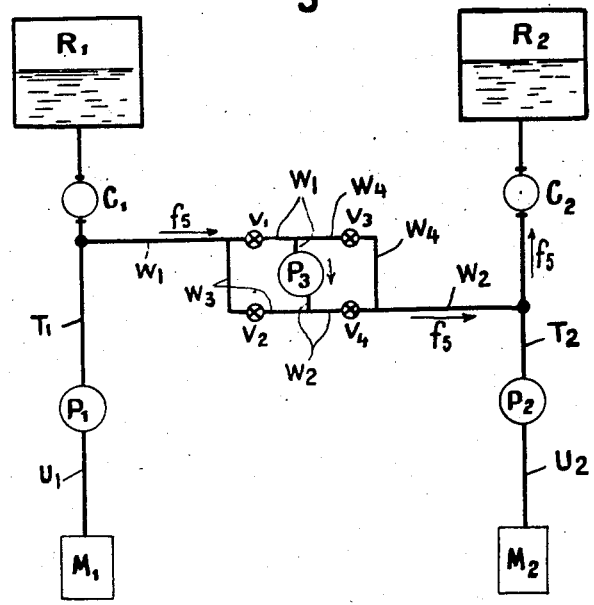

Patented Jan. 6, 1942

2,268,957

UNITED STATES PATENT OFFICE 2,268,957

SYSTEM FOR SUPPLYING AND METERING LIQUID FUEL TO MOTORS

Bernard Gabriel Marie Muselier, Paris, France, assignor to Jean Faure Herman, Boulogne-sur-Seine, France Application August 28, 1939, Serial No. 292,331
In France September 12, 1938

3 Claims. (Cl. 73—195)

This invention relates to systems for supplying and measuring the delivery of fuel to motors or engines of the type particularly used on aircraft.

Aircraft powered by more than one motor or engine frequently have separate fuel tanks or reservoirs supplying each motor. One of these motors may exhaust its available fuel supply from one of the tanks before the other and it therefore becomes desirable to transfer some of the fuel from the remaining partially filled tank to the other. At the same time it is necessary to meter or measure the fuel consumed by each engine not only while the original fuel supply of each tank is available, but after the transfer of fuel is effected from one tank to the other.

In that connection, the invention not only contemplates a novel arrangement whereby the transfer of fuel to one tank to the other may be readily accomplished, but, at the same time, when the transfer is made to the tank whose supply is depleted, the meter associated with that tank will not become broken or damaged by back-flow incident to the transfer and will be ready to function when the transferred supply is again available to the related motor.

An installation including the present system for distributing fuel to two motors is shown, by way of example, in the accompanying drawings, wherein:

Figure 1 is an axial sectional view of the meter assembly.

Figure 2 is a partial axial sectional view showing more particularly the unidirectional driving device inserted between the measuring device and the indicating device.

Figure 3 is a partial view through the line 3—3 of Figure 2.

Figures 4 and 5 are plan views showing a portion of the transmission between the measuring system and the gear-work.

Figure 6 shows a power plant comprising the preceding meters.

The meter (Figure 1) adapted for being mounted preferably on the pipe which supplies an aircraft engine with fuel comprises: a measuring system which has been shown in the form of vanes 1—2 movable under the action of the flow of fuel and of gears 3₂ . . . ; a gear-work driven by the measuring system and driving indicator means indicating the delivery, such as pointers (40—50). This mechanism is shown in the form of a gear 4 and a pinion 5. The measuring system and the gear-work may be of any desired type.

According to the invention the mechanical connection between the measuring system and the gear-work is effected by means of a unidirectional driving device inserted between the measuring system 1—2 and the gear-work 4—5.

The driving device (Figures 2, 3, 4 and 5) comprises a fork 22 with two prongs carried by the shaft 23 of the gear-work. Both prongs engage each two openings 24 provided in a plate 25 which forms the first rotatable member. This plate 25 can freely rotate in the middle part of a toothed crown 26 which forms the second rotatable member. This gear 26 is driven by the gear 27 of the measuring system.

A coupling member in the form of a pin 28 is slidably mounted inwardly of the plate 25. This pin 28 is constantly urged by a spring 29 in the direction $f_1$ (Figure 4) and rests constantly on the inner part of the gear 26 which comprises a stop 31 and an eccentrically arranged bearing surface 30 (Figure 3).

The operation of the unidirectional driving device is as follows.

In the normal operation the fuel flows through the measuring system and rotates the same in the direction $f_2$.

The pin 28 engages the stop 31 of the gear 26 and drives the plate 25 through the medium of the gear 26 and, accordingly, the shaft 23 of the gear-work through the medium of the fork 22.

In this moment the meter accomplishes its normal function.

If, owing to a fault in the assembly, for instance, the fuel drives the measuring system and the gear 26 in the direction $f_3$, the pin 28 slides on the sloping surface 30 of the gear 26, which continues its movement of rotation without driving the plate 25 which is rigidly connected with the shaft 23 of the gear-work.

Briefly stated, it is possible through the above described arrangements and without any danger of breaking the mechanism nor of giving false indications, to drive the mechanism in a single direction.

More particularly, the device according to the invention can be used in any supply plant comprising a meter such as 1—2.

In the case of a meter comprising a rigid driving device which has been mounted on the wrong side by mistake, the shaft of said meter would be broken or the meter would give false indications.

On the contrary, a meter even when mounted on the wrong side but provided with a unidirectional driving device according to the invention will insure the supply of the engine with fuel without being damaged, so that it will operate when put into the correct position.

The preceding meters can be mounted in any power plant and more particularly in the power plant which is shown in Figure 7. This plant includes a first engine M1 and a second engine M2; each engine M1 and M2 is supplied with fuel through a pump assembly (first pump P1 and second pump P2) drawing in fuel from a first tank R1 and from a second tank R2 respectively through a pipe T1, T2 and leading it to the engine through a pipe or conduit U1, U2. On each pipe T1, T2 is mounted a meter C1, C2 according to the invention; the pipes T1, T2 are connected together through the transfer pipe lines W1, W2 on which a cut-off valve V1, a hand pump P3 and a cut-off valve V4 are inserted.

The transfer pipe line W1 connects the pipe line T1 with the intake side of the manually controlled or hand-operated pump P3, and includes the cut-off valve V1. The transfer line W2 connects the pipe line T2 with the outlet side of the pump P3 and includes the valve V4. A first by-pass line W3 establishes communication between the outlet side of the pump P3 and the transfer line W1 at a point between the cut-off valve V1 and the pipe line T1, said by-pass line W3 including the cut-off valve V2. A second by-pass line W4 connects with the intake side of the pump P3 through a portion of the line W1 and also connects with the transfer pipe W2 at a point between the cut-off valve V4 and the pipe line T2, and includes the cut-off valve V3.

In the normal operation each engine is supplied with fuel through its own pump and the valves V1, V2, V3 and V4 are closed.

If, for any reason, and more particularly when one of the tanks is completely empty, as for instance R2, the operator wishes to cause a certain quantity of fuel from the tank R1 to flow into the tank R2 without stopping the engines, he will open the valves V1 and V4, the valves V2 and V3 remaining closed, and by means of the hand pump P3 he will cause the fuel to pass into the by-pass in the direction $f_5$.

In this instance the fuel flows through the meter C2 in the reverse direction with respect to the normal rotation and the unidirectional driving device, according to the direction of the flow of liquid which drives the gear-work, will prevent the apparatus from being damaged, giving false indications of the fuel used and will be ready for use again in its normal operation by the operator after the pump P3 has been stopped and after the valves V1 and V4 have been closed.

Owing to the arrangements according to the present invention, during the manipulations effected by the operator, the engines are further supplied with fuel and permit of the aircraft effecting further its manoeuvres.

I claim:

1. Means for distributing and measuring liquid fuel to a plurality of engines, comprising, in combination, a fuel tank, a pipe line connecting one of said engines and tank and having therein a motor operated pump and a meter having a uni-directional driving device, a second tank, a second pipe line connecting a second of said engines and tank and also having therein a motor operated pump and a meter provided with a uni-directional driving device, and transfer conduit means connecting said first and second pipe lines for conveying liquid fuel from one tank to the other when the supply in the tank serving one motor has been depleted, said means comprising a pair of transfer pipe sections having their outer ends respectively connected with said first and second pipe lines, a manually operated pump having its intake connected to one of said transfer pipes and its outlet connected to the other of said pipes, cut-off valves in each transfer line and respectively located between the intake for the manually controlled pump and said first mentioned pipe line and between the outlet side of said pump and the second mentioned pipe line, a by-pass including a cut-off valve connecting the outlet side of the manually controlled pump with the first transfer pipe line between the cut-off valve therein and said first pipe line, and another by-pass including a cut-off valve connecting the intake side of said manually operated pump and the second transfer line at a point between the said cut-off valve therein and the second mentioned pipe line.

2. A system for supplying, distributing, and metering liquid fuel to a plurality of engines, comprising, in combination, liquid fuel tanks, a supply line connecting each tank with a related engine, a motor operated pump and a meter having a uni-directional driving device in each supply line, and means for transferring liquid fuel from one tank to another through said supply lines, said means comprising a pair of transfer pipe lines each connected at one end with one of said supply lines, a manually operated pump having its intake side connected to one end of one of said transfer lines and having its outlet side connected with the other of said transfer lines, a pair of by-pass pipe lines connecting the transfer lines at opposite sides of the manually operated pump, and a plurality of valves in the transfer and by-pass lines, all of said valves when closed permitting each motor to be supplied with fuel from its related tank, said valves in the transfer lines when opened and the valves in the by-pass lines when closed permitting the manually operated pump to transfer fuel from one tank to another, and said valves in the transfer lines when closed and the valves in the by-pass lines when opened permitting reverse transfer of fuel from one tank to the other, the inlet and the outlet of the manually operated pump serving in the same capacity for either direction of flow.

3. In a supply plant for supplying fuel to two engines, a first fuel tank, a first pump drawing in the fuel from the tank, the first engine being supplied with fuel by the first pump, a conduit connecting the tank with the first pump, a conduit connecting the first pump with the first engine, a first meter for measuring the delivery having a unidirectional driving device inserted on the conduit connecting the first tank with the pump, a second fuel tank, a second pump drawing in fuel from the second tank, the second engine being supplied with fuel from the second pump, a conduit connecting the second tank with the second pump, a conduit connecting the second pump with the second engine, a second meter for measuring the delivery having a unidirectional driving device inserted on the conduit connecting the second tank with the second pump, a by-pass uniting together the conduits which connect each tank respectively with the corresponding pump between the meters and the pumps, a hand pump mounted on the said by-pass, a first cut-off valve inserted on the said by-pass in advance of the hand-pump, a second cut-off valve inserted on the said by-pass behind the hand pump, a second by-pass connecting the outlet of the hand pump with said by-pass between the valve and the first mentioned conduit, a cut-off valve mounted on the said second by-pass, a third by-pass connecting the intake side of the hand pump with the first-mentioned by-pass between the second cut-off valve and the third mentioned conduit and including a valve.

BERNARD GABRIEL MARIE MUSELIER.